United States Patent
Olsson et al.

(10) Patent No.: US 8,320,312 B2
(45) Date of Patent: Nov. 27, 2012

(54) EDGE CONTINUED EVOLUTION, IMPROVED CHANNEL REQUEST METHOD AND SYSTEM

(75) Inventors: Andreas Olsson, Stockholm (SE); Håkan Axelsson, Linköping (SE); John Diachina, Garner, NC (US); Peter Östrup, Linköping (SE)

(73) Assignee: Telefonaktiebolaget LM Ericssson (publ), Stockholm (SE)

( * ) Notice: Subject to any disclaimer, the term of this patent is extended or adjusted under 35 U.S.C. 154(b) by 278 days.

(21) Appl. No.: 12/444,525

(22) PCT Filed: Oct. 4, 2007

(86) PCT No.: PCT/SE2007/050708
§ 371 (c)(1),
(2), (4) Date: Apr. 6, 2009

(87) PCT Pub. No.: WO2008/041941
PCT Pub. Date: Apr. 10, 2008

(65) Prior Publication Data
US 2010/0080125 A1    Apr. 1, 2010

Related U.S. Application Data

(60) Provisional application No. 60/828,287, filed on Oct. 5, 2006.

(51) Int. Cl.
*H04W 4/00* (2009.01)
*H04B 7/00* (2006.01)
(52) U.S. Cl. ......... 370/329; 370/330; 455/509; 455/510
(58) Field of Classification Search .................. 370/235, 370/328, 329, 330; 455/63.1, 329, 509, 510, 455/515
See application file for complete search history.

(56) References Cited

U.S. PATENT DOCUMENTS

2003/0076812 A1* 4/2003 Benedittis ............... 370/350
(Continued)

FOREIGN PATENT DOCUMENTS

EP    1835670 A1    9/2007

OTHER PUBLICATIONS

3GPP TSG GERAN2#29bis Tdoc G2-060185, 5.3.3.2, "Latency enhancements—System concept (working assumptions)" Ericsson, Siemens, So~olis, France, May 22-24, 2006.*

(Continued)

*Primary Examiner* — Michael Thier
*Assistant Examiner* — Awet Haile

(57) ABSTRACT

The present invention is a method and system adapted to facilitate, between a mobile station (MS) and network, an indication of support for reduced time transmission interval (RTTI). The MS can provide a base station system (BSS) with an indication of its multislot capability within an access burst sent at the start of a contention based access. In another aspect, the MS can indicate support for a new Immediate Assignment message as the conventional Immediate Assignment message can only assign single timeslots. The present invention enables the Radio Access Network (RAN) to assign RTTI and more than one timeslot for GPRS/EDGE temporary block flows (TBFs) during an Access Grant Channel (AGCH) assignment. The method of the present invention can be implemented in a computer program product or distributed software adapted to be loaded into at least one or a plurality of memory locations and executed by at least one or a plurality of respective computer processors.

30 Claims, 12 Drawing Sheets

U.S. PATENT DOCUMENTS

| | | | |
|---|---|---|---|
| 2004/0100940 A1 | 5/2004 | Kuure et al. | |
| 2005/0243744 A1* | 11/2005 | Tan | 370/278 |
| 2006/0072520 A1* | 4/2006 | Chitrapu et al. | 370/337 |
| 2006/0280142 A1* | 12/2006 | Damnjanovic et al. | 370/329 |
| 2008/0019310 A1* | 1/2008 | Sebire et al. | 370/329 |
| 2008/0225802 A1* | 9/2008 | Sun et al. | 370/336 |
| 2008/0254804 A1* | 10/2008 | Lohr et al. | 455/442 |

OTHER PUBLICATIONS

Ericsson "Flexible Multi-slot EGPRS Access over CCCH" #GPP TSG GERAN WG2 #31bis, Tdoc G2-060286, Turin, Italy, Oct. 16-20, 2006, Section 1-4.

Axelsson, H et al. Improved Latency Performance with GSM/EDGE Continued Evolution. IEEE 2006, Section (I, II, V, VI).

Ericsson. Bandwidth Requirement of VoIO with 10 ms TTI. 3GPP TSG GERAN #26, Tdoc GP-060256, Brussels, Belgium. Jan. 16, 2006.

3GPP $3^{rd}$ Generation Partnership Project; Technical Specification Group GSM/EDGE Radio Access Network; General Packet Radio Service (GPRS); Mobile Station (MS) Base Station System (BSS) Interface; Radio Link Control/Medium Access Control (RLC/MAC) Protocol (Release 7). 3GPP TS 44.060 v7.6.0 (Sep. 2006).

RTTI Blocks &, (Extended) Dynamic Allocation. Siemens 3GPP TSG GERAN#31, Denver USA. GP-061666. Sep. 2006.

3GPP. $3^{rd}$ Generation Partnership Project; Technical Specification Group GSM/EDGE Radio Access Network; Multiplexing and Multiple Access on the Radio Path (Release 7). 3GPP TS 45.002 v7.1.0 (Jun. 2006).

GERAN Evolution—Summary of Application Gains with RTTI and Shorter RRBP. 3GPP TSG GERAN #29bis. G2-060186. May 26, 2006.

* cited by examiner

```
< EGPRS Packet channel request message content > ::=
    < One Phase Access Request :              0         < MultislotClass : bit (5) >
                                                        < Priority : bit (2) >
                                                        < RandomBits : bit (3) > >
    | < Short Access Request :                100       - The value 100 was allocated
in an earlier version of the protocol and shall not be used by the mobile station
                                                        < NumberOfBlocks : bit (3) >
                                                        < Priority : bit (2) >
                                                        < RandomBits : bit (3) > >
    | < Two Phase Access Request :            110000    < Priority : bit (2) >
                                                        < RandomBits : bit (3) > >
    | < Signalling :                          110011    < RandomBits : bit (5) > >
    | < One phase Access Request in RLC unack mode :    110101 < RandomBits : bit (5)
> >
    | < Dedicated Channel Request :           110110    < RandomBits : bit (5) > >
    | < Emergency call :                      110111    < RandomBits : bit (5) > > ;
```

FIG. 1          100

```
< EGPRS Packet channel request message content > ::=
    < One Phase Access Request :                            0           < MultislotClass : bit (5) >
                                                                        < Priority : bit (2) >
                                                                        < RandomBits : bit (3) > >
    | < Short Access Request :                              100         - The value 100 was allocated in an
earlier version of the protocol and shall not be used by the mobile station
                                                                        < NumberOfBlocks : bit (3) >
                                                                        < Priority : bit (2) >
                                                                        < RandomBits : bit (3) > >
    | < Multislot Access Request :                          111         < MultislotClassLimited : bit (3) >
                                                                        < Priority : bit (2)>
                                                                        < RandomBits : bit (3) > >

| < Two Phase Access Request :                          110000      < Priority : bit (2) >
                                                                        < RandomBits : bit (3) > >
    | < Signalling :                                        110011      < RandomBits : bit (5) > >
    | < One phase Access Request in RLC unack mode :        110101      < RandomBits : bit (6) > >
    | < Dedicated Channel Request :                         110110      < RandomBits : bit (5) > >
    | < Emergency call :                                    110111      < RandomBits : bit (5) > > ;
```

FIG. 2     200 

```
bit
3 2 1
0 0 0   multislot class 10
0 0 1   multislot class 11
0 1 0   multislot class 12
0 1 1   multislot class 31
1 0 0   multislot class 32
1 0 1   multislot class 33
1 1 0   multislot class 34
1 1 1   reserved for future use
```
FIG. 3        300 

```
< EGPRS Packet channel request message content > ::=
    < One Phase Access Request :                          0          < MultislotClass : bit (5) >
                                                                     < Priority : bit (2) >
                                                                     < RandomBits : bit (3) > >

| < Short Access Request :                            100        - The value 100 was allocated in an
earlier version of the protocol and shall not be used by the mobile station
                                                                     < NumberOfBlocks : bit (3) >
                                                                     < Priority : bit (2) >
                                                                     < RandomBits : bit (3) > >
    | < Multislot Access Request :                        111        < MultislotClassLimited : bit (3) >
                                                                     < TTICapabilities: bit(1)>
                                                                     < Spare: bit(1) >
                                                                     < RandomBits : bit (3) > >

| < Two Phase Access Request :                        110000     < Priority : bit (2) >
                                                                     < RandomBits : bit (3) > >
    | < Signalling :                                      110011     < RandomBits : bit (5) > >
    | < One phase Access Request in RLC unack mode :      110101     < RandomBits : bit (5) > >
    | < Dedicated Channel Request :                       110110     < RandomBits : bit (5) > >
    | < Emergency call :                                  110111     < RandomBits : bit (6) > > ;
```

FIG. 4                400

```
bit
3 2 1
0 0 0   multislot class 10
0 0 1   multislot class 11
0 1 0   multislot class 12
0 1 1   multislot class 31
1 0 0   multislot class 32
1 0 1   multislot class 33
1 1 0   multislot class 34
1 1 1   reserved for future use
```

FIG. 5          500

| Multislot class | Maximum number of slots | | | Minimum number of slots | | | | Type |
|---|---|---|---|---|---|---|---|---|
| | Rx | Tx | Sum | $T_{ta}$ | $T_{tb}$ | $T_{ra}$ | $T_{rb}$ | |
| 1 | 1 | 1 | 2 | 3 | 2 | 4 | 2 | 1 |
| 2 | 2 | 1 | 3 | 3 | 2 | 3 | 1 | 1 |
| 3 | 2 | 2 | 3 | 3 | 2 | 3 | 1 | 1 |
| 4 | 3 | 1 | 4 | 3 | 1 | 3 | 1 | 1 |
| 5 | 2 | 2 | 4 | 3 | 1 | 3 | 1 | 1 |
| 6 | 3 | 2 | 4 | 3 | 1 | 3 | 1 | 1 |
| 7 | 3 | 3 | 4 | 3 | 1 | 3 | 1 | 1 |
| 8 | 4 | 1 | 5 | 3 | 1 | 2 | 1 | 1 |
| 9 | 3 | 2 | 5 | 3 | 1 | 2 | 1 | 1 |
| 10 | 4 | 2 | 5 | 3 | 1 | 2 | 1 | 1 |
| 11 | 4 | 3 | 5 | 3 | 1 | 2 | 1 | 1 |
| 12 | 4 | 4 | 5 | 2 | 1 | 2 | 1 | 1 |
| 13 | 3 | 3 | NA | NA | a) | 3 | a) | 2 |
| 14 | 4 | 4 | NA | NA | a) | 3 | a) | 2 |
| 15 | 5 | 5 | NA | NA | a) | 3 | a) | 2 |
| 16 | 6 | 6 | NA | NA | a) | 2 | a) | 2 |
| 17 | 7 | 7 | NA | NA | a) | 1 | 0 | 2 |
| 18 | 8 | 8 | NA | NA | 0 | 0 | 0 | 2 |
| 19 | 6 | 2 | NA | 3 | b) | 2 | c) | 1 |
| 20 | 6 | 3 | NA | 3 | b) | 2 | c) | 1 |
| 21 | 6 | 4 | NA | 3 | b) | 2 | c) | 1 |
| 22 | 6 | 4 | NA | 2 | b) | 2 | c) | 1 |
| 23 | 6 | 6 | NA | 2 | b) | 2 | c) | 1 |
| 24 | 8 | 2 | NA | 3 | b) | 2 | c) | 1 |
| 25 | 8 | 3 | NA | 3 | b) | 2 | c) | 1 |
| 26 | 8 | 4 | NA | 3 | b) | 2 | c) | 1 |
| 27 | 8 | 4 | NA | 2 | b) | 2 | c) | 1 |
| 28 | 8 | 6 | NA | 2 | b) | 2 | c) | 1 |
| 29 | 8 | 8 | NA | 2 | b) | 2 | c) | 1 |
| 30 | 5 | 1 | 6 | 2 | 1 | 1 | 1 | 1 |
| 31 | 5 | 2 | 6 | 2 | 1 | 1 | 1 | 1 |
| 32 | 5 | 3 | 6 | 2 | 1 | 1 | 1 | 1 |
| 33 | 5 | 4 | 6 | 2 | 1 | 1 | 1 | 1 |
| 34 | 5 | 5 | 6 | 2 | 1 | 1 | 1 | 1 |
| 35 | 5 | 1 | 6 | 2 | 1 | 1+to | 1 | 1 |
| 36 | 5 | 2 | 6 | 2 | 1 | 1+to | 1 | 1 |
| 37 | 5 | 3 | 6 | 2 | 1 | 1+to | 1 | 1 |
| 38 | 5 | 4 | 6 | 2 | 1 | 1+to | 1 | 1 |
| 39 | 5 | 5 | 6 | 2 | 1 | 1+to | 1 | 1 |
| 40 | 6 | 1 | 7 | 1 | 1 | 1 | to | 1 |
| 41 | 6 | 2 | 7 | 1 | 1 | 1 | to | 1 |
| 42 | 6 | 3 | 7 | 1 | 1 | 1 | to | 1 |
| 43 | 6 | 4 | 7 | 1 | 1 | 1 | to | 1 |
| 44 | 6 | 5 | 7 | 1 | 1 | 1 | to | 1 |
| 45 | 6 | 6 | 7 | 1 | 1 | 1 | to | 1 |

FIG. 7   700

| Training sequence (see 3GPP TS 45.002) | bits 11......1 | Packet Channel Access |
|---|---|---|
| TS1 | < EGPRS Packet channel request message content > | EGPRS with 8PSK capability in uplink |
| TS2 | < EGPRS Packet channel request message content > | (EGPRS without 8PSK capability in uplink, not used anymore). EGPRS with 8PSK capability in uplink and support for RTTI |

FIG. 8    800

| MCS | Legacy procedure | Proposed procedure |
|---|---|---|
| MCS-2 | 380ms | 220ms |
| MCS-5 | 300ms | 140ms |

EDGE CONTINUED EVOLUTION, IMPROVED CHANNEL REQUEST METHOD AND SYSTEM

CROSS-REFERENCE TO RELATED APPLICATIONS

This application claims the benefit of U.S. Provisional Application No. 60/828,287, filed Oct. 5, 2006, the disclosure of which is incorporated herein by reference.

BACKGROUND OF THE INVENTION

The present invention relates to wireless communication systems. More particularly, and not by way of limitation, the present invention is directed to a system and method for reducing latency between Wideband Code Division Multiplex Access (WCDMA) systems and Enhanced Data GSM Environment (EDGE) systems. EDGE is a wireless Third Generation (3G) technology that allows it to increase data transmission rate and improve data transmission reliability. EDGE can be used for any packet switched application such as an Internet connection. EDGE is implemented as an add-on enhancement to 2G and 2.5G Global System for Mobile Communications (GSM) and General Packet Radio Service (GPRS) networks, making it easier for existing GSM carriers to upgrade to it. Although EDGE requires no hardware or software changes to be made in GSM core networks, base stations must be modified to implement EDGE. EDGE compatible transceiver units must be installed and the base station subsystem (BSS) must be upgraded to support EDGE. New mobile terminal hardware and software are also required to decode/encode the new modulation and coding schemes and carry the higher user data rates to implement new services. However, in the continuing evolution of the 3G standard, WCDMA has been developed. More technically, WCDMA is a wideband spread-spectrum mobile air interface that utilizes the direct sequence Code Division Multiple Access (CDMA) signaling method to achieve higher speeds and support more users compared to the implementation of time division multiplexing (TDMA) used by 2G GSM networks. WCDMA has been developed into a complete set of specifications, a detailed protocol that defines how a mobile phone communicates with the tower, how signals are modulated, how datagrams are structured, and system interfaces are specified allowing free competition on technology elements.

The Third Generation Partnership Project (3GPP) continues to evolve the technology used in wireless communication systems from EDGE to WCDMA. In connection therewith, an objective is to obtain seamless workability between WCDMA and EDGE by reducing latency. This is critical in symmetric service applications such as Voice over IP (VoIP), interactive gaming and push-to-talk over cellular (PoC).

In a conventional system, the mobile station (MS) is capable of indicating to the RAN that it can handle more than 1 time slot (TS) in the uplink, however the RAN is restricted by the current 3GPP standard to assigning only 1TS for an uplink TBF until it finds out about the MS capabilities, either during the second phase of a two phase access or by querying the Serving GPRS Support Node (SGSN) for this information for the case of a one phase access. The result of this is a slower ramp-up in throughput and an increased delay. This restriction increases the initial delay for services like VoIP and Push-to-talk (PoC).

It would be advantageous to have a system and method that reduces latency between WCDMA systems and EDGE systems such that it overcomes the disadvantages of the prior art. The present invention provides such a system and method.

BRIEF SUMMARY OF THE INVENTION

One aspect of the present invention is directed to a method and system for an MS to indicate support for reduced time transmission interval (RTTI). Note that a 10 ms round trip time (RTT) can be used immediately instead of using 20 ms RTT in the beginning and then upgrading it to 10 ms RTT. In another aspect, the present invention is directed to a method and system for the MS to provide a base station system (BSS) with an indication of its multislot capability (the new Rel. 5 multislot classes) within an access burst sent at the start of a contention based access. In yet another aspect, the present invention is directed to a method and system for an MS to indicate support for a new Immediate Assignment message as the conventional Immediate Assignment message can only assign single timeslots. The present invention enables the Radio Access Network (RAN) to assign RTTI and more than one timeslot for GPRS/EDGE temporary block flows (TBFs) TBFs during an Access Grant Channel (AGCH) assignment. The method of the present invention can be implemented in a computer program product or distributed software adapted to be loaded into at least one or a plurality of memory locations and executed by at least one or a plurality of respective computer processors.

BRIEF DESCRIPTION OF THE SEVERAL VIEWS OF THE DRAWING

In the following section, the invention will be described with reference to exemplary embodiments illustrated in the figures, in which:

FIG. 1 is a table showing the legacy format of an Enhanced GPRS (EGPRS) Packet channel request;

FIG. 2 is a table illustrating the present invention of a packet channel request without the option of indicating RTTI;

FIG. 3 illustrates defined coding for the information field indicating the EGPRS multislot class of the MS;

FIG. 4 is a table illustrating the present invention of a packet channel request with the option of indicating RTTI;

FIG. 5 illustrates defined coding for the information field indicating the EGPRS multislot class of the MS;

FIG. 7 is a table is an example how many timeslots a mobile station supports in downlink (RX) and uplink (TX) respectively, depending on the multislot class it supports;

FIG. 8 is a table illustrating a EGPRS packet channel request; FIG. 9 is a table illustrating the gain for transmitting 1000 bytes of payload;

DETAILED DESCRIPTION OF THE INVENTION

One aspect of the present invention is directed to a method and system for an MS to indicate support for RTTI. In another aspect, the present invention is directed to a method and system for the MS to provide a base station system (BSS) with an indication of its multislot capability within an access burst sent at the start of a contention based access. In yet another aspect, the present invention is directed to a method and system for an MS to indicate support for a new Immediate Assignment message as the conventional Immediate Assignment message can only assign single timeslots. The present invention enables the Radio Access Network (RAN) to assign reduced time transmission interval (RTTI) and more than one timeslot for GPRS/EDGE temporary block flows (TBFs) TBFs during an Access Grant Channel (AGCH) assignment. The method of the present invention can be implemented in a computer program product or distributed software adapted to be loaded into at least one or a plurality of memory locations and executed by at least one or a plurality of respective computer processors.

Multislot Assignment

The present invention is a method and system that introduces a new field in an Immediate Assignment message sent on AGCH, or alternatively, on a new Multislot Immediate Assignment message, to allocate the MS more than 1 TS on the uplink and one or more TS on the downlink. For the RAN to be able to send this message it has to know if the MS is capable of receiving it, hence the MS must first indicate to the RAN that it has this ability. The only way for an MS to do this is to include new information in the access burst sent by the MS at initial system access on the Random Access Channel (RACH). For the MS to know which RANs support this new format, the access burst System Information (SI) sent by the RAN must be modified to provide this indication.

Referring to FIG. 1, a table 100 showing the legacy format of an Enhanced GPRS (EGPRS) Packet channel request is provided.

FIG. 2 is a table 200 illustrating the present invention of a packet channel request without the option of indicating RTTI.

A three (3) bit field named, e.g., MultislotClassLimited is an information field indicating the EGPRS multislot class of the MS. The multislot class indicated by this field is according 3GPP 45.002. The coding is defined in the table 300 of FIG. 3.

FIG. 4 is a table 400 illustrating the present invention of a packet channel request with the option of indicating RTTI.

A three (3) bit field named, e.g., MultislotClassLimited is an information field indicating the EGPRS multislot class of the MS. The multislot class indicated by this field is according 3GPP 45.002.The coding is defined in the table 500 of FIG. 5.

Figure 6:
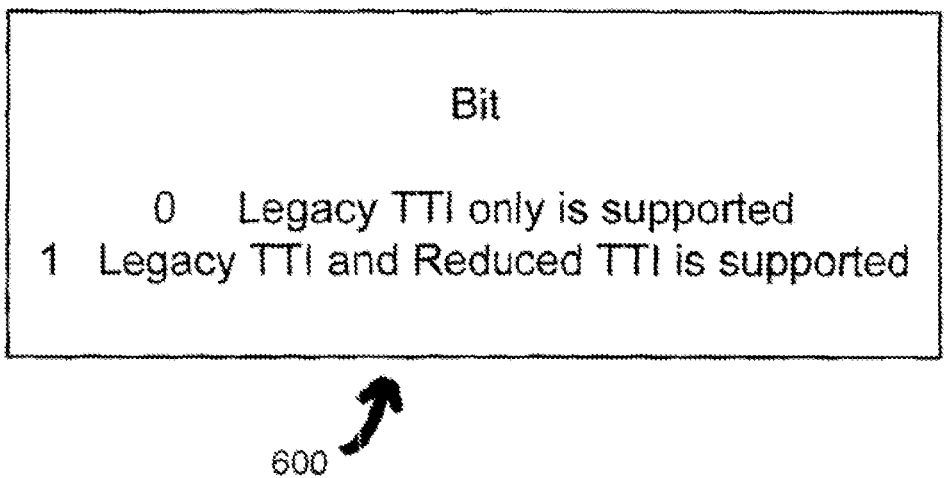
FIG. 6 illustrates defined coding for the information field indicating the TTI capabilities of the MS.

A one (1) bit field named, e.g., TICapabilities is an information field that indicates the TTI capabilities of the MS. The coding is defined in the table 600 of FIG. 6.

FIG. 7 is a table 700, taken from current standard specifications and shows for example how many timeslots a mobile station supports in downlink (RX) and uplink (TX) respectively, depending on the multislot class it supports. So, the mobile station reports its multislot class (a single number) to the network, which translates into a number of attributes (RX, TX, Sum, etc.) in table 7.

An alternative MS indication for RTTI (10 ms RTT) support is now discussed. Instead of using the priority bits it is possible to use one of the already standardized Training Sequence Codes. FIG. 8 is a table 800 illustrating a EGPRS packet channel request. To differentiate the "RTTI support" access from the "Legacy GMSK only support in UL" access, the new "RTTI support" has to be combined with the EGPRS Multislot Access message. An advantage of the foregoing is that the use of priority bits can still be used in a EGPRS Multislot Access message.

Applications such as Conversational VoIP and PoC put significant demands on GERAN. One demand is to support quick access, along with quick establishment of multislot operation, for applications using protocols with extensive signaling during service access (such as SIP). The present invention implements this and improves service access for most applications in general, and applications such as VoIP and PoC in particular.

Referring now to FIG. 9, multislot operation can be used 160 ms earlier with the method of the present invention compared to the conventional procedure. As an example, with 3 additional timeslots, 1344 bytes can be transmitted using MCS-5 on 160 ms, and 672 bytes using MCS-2 (assuming 0% BLER). Another example is how long time it would take to transmit a 1000 bytes large packet. The result is shown in the table 900 of FIG. 9. Again, assuming 0% BLER for simplicity, and the time is from the 0 ms time position in as seen in FIGS. 1, 2 and 3. The results assume a MS capable of 4 TS in the UL. As can be seen in the table 900 of FIG. 9, the gain for transmitting 1000 bytes of payload is 160 ms.

Figure 10:
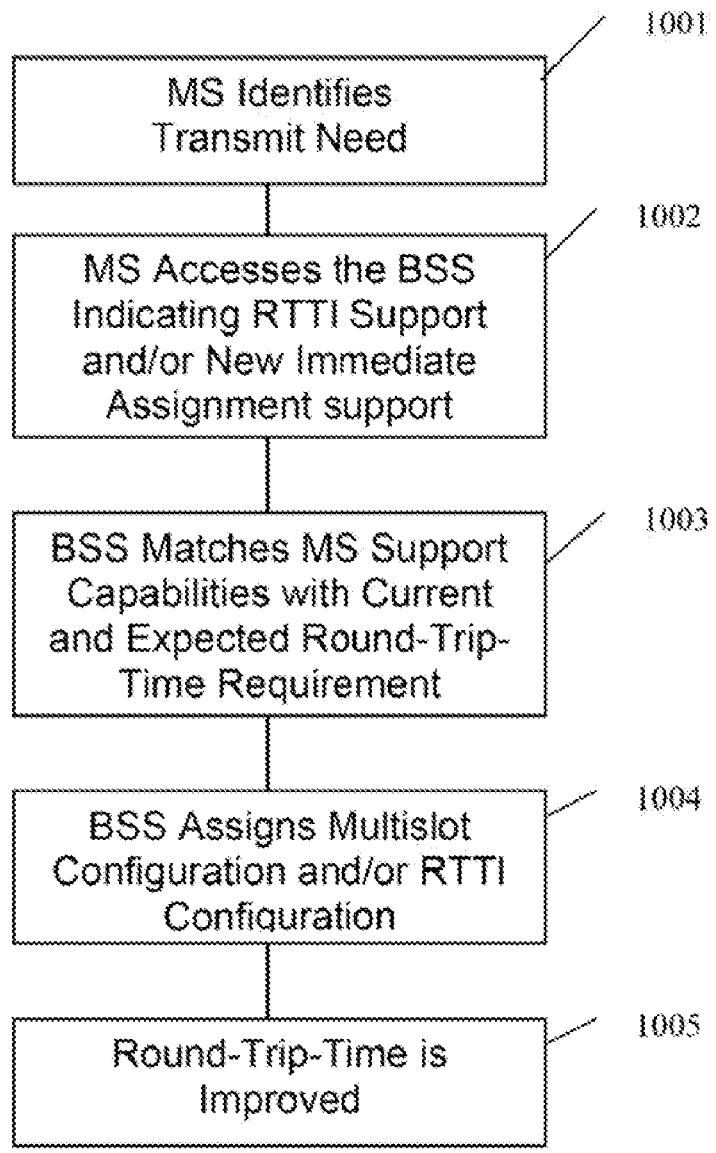
FIG. 10 is a flow chart of the method of an aspect of the present invention.

Referring now to FIG. 10, a flow chart 1000 of the method of the present invention is presented. As seen therein, in step 1001, a MS identifies a transmit need. In step 1002, the MS accesses the BSS indicating RTTI support and/or New Immediate Assignment support. In step 1003, the BSS matches MS support capabilities with current and expected round-trip-time requirement. In step 1004, the BSS assigns multislot configuration and/or RTTI configuration and in step 1005, the round trip time is improved when possible and required.

Figure 11A:
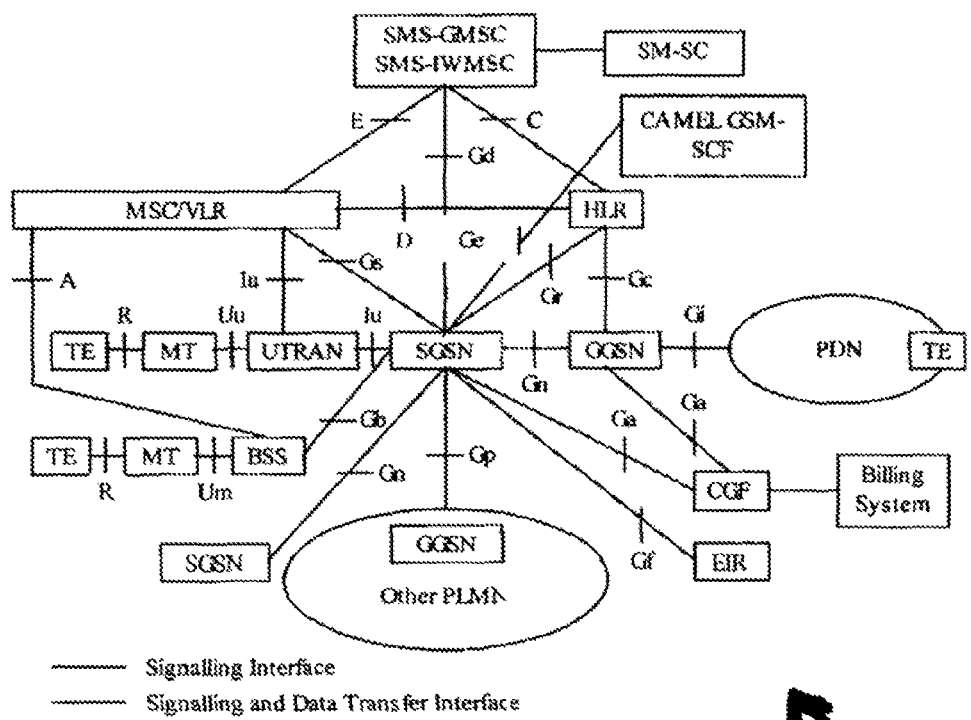
FIGS. 11A and 11B are block diagrams of the system and nodes in which an aspect of the method of the present invention can be implemented.
Figure 11B:
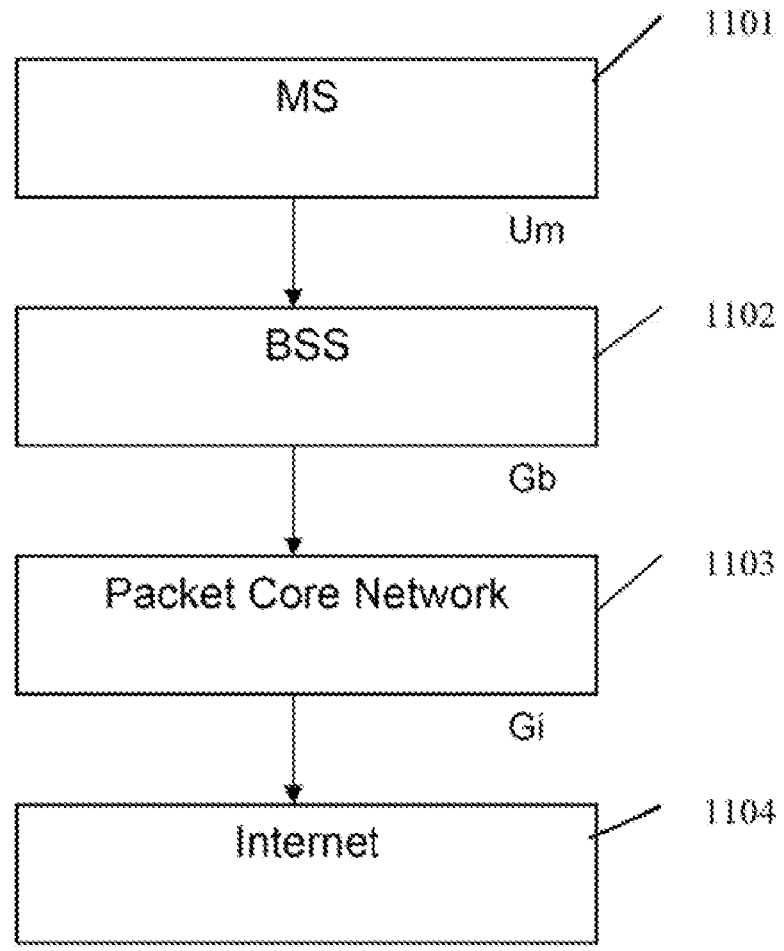

FIG. 11B is the radio and core network of a wireless telecommunications system in which the method 1000 of the present invention is implemented. FIG. 11B is a block diagram 1101 showing components the system in which the present invention is implemented, showing the interfaces between the nodes thereof. As seen therein The MS 1001 is the end-user equipment that is coupled via a communication channel (interface Um) to the BSS 1102 which controls the radio connection. The BSS 1102 is coupled to the packet core network 1103 via interface Gb. The packet core network 1103 controls the connection between mobile network and internet 1104 via interface Gi. The internet 1104 is the turning-point in a round-trip. The method of the present invention can be implemented in a computer program product or distributed software adapted to be loaded into at least one or a plurality of memory locations (in the MS 1101 and the BSS 1102) and executed by at least one or a plurality of respective computer processors (in the MS 1101 and the BSS 1102).

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of reducing latency in a communications channel, comprising the steps of:
   receiving, by a Radio Access Network (RAN), an indication in a packet channel request from a mobile station (MS) where the indication indicates that the MS supports a reduced time transmission interval (RTTI);
   including, by the RAN, an additional field in an Immediate Assignment message sent on an Access Grant Channel (AGCH); and,
   using, by the RAN in response to receiving the indication, the additional field to allocate to the MS more than one time slot (TS) on an uplink of the communications channel and one or more time slots on a downlink of the communications channel, wherein the MS by indicating support for the RTTI indicates that a 10 ms round trip time (RTT) is to be used immediately instead of using 20 ms RTT in beginning and then upgrading to 10 ms RTT.

2. The method of claim 1, wherein the communications channel includes a Wideband Code Division Multiplex Access (WCDMA) system and an Enhanced Data GSM Environment (EDGE) system.

3. The method of claim 2, further comprising the step of assigning, by the RAN, the reduced time transmission interval (RTTI) and more than one timeslot for GPRS/EDGE temporary block flows (TBFs) during an AGCH assignment.

4. The method of claim 3, further comprising the step of indicating by the MS to the RAN that it has the ability to accept the Immediate Assignment message.

5. The method of claim 4, further comprising the step of including, by the MS, information in an access burst sent by the MS at initial system access on the Random Access Channel (RACH) indicating the ability of the MS to accept the Immediate Assignment message.

6. The method of claim 5, further comprising the step of modifying access burst System Information (SI) sent by the RAN to indicate to the MS the ability of the RAN to support the Immediate Assignment message.

7. The method of claim 1, wherein the Immediate Assignment message is a Multislot Immediate Assignment message.

8. A method of reducing latency in a communications channel, comprising the steps of:
identifying, by a mobile station (MS), a transmit need;
accessing, by the MS, a base station subsystem (BSS);
indicating, by the MS, the support thereof for at least one of a reduced time transmission interval (RTTI) and New Immediate Assignment message;
matching, by the BSS, the MS support capabilities with current and expected round trip time requirements;
assigning, by the BSS, multislot configuration and RTTI configuration;
using, by the BSS in response to the indicating step, an additional field in an Immediate Assignment message sent on an Access Grant Channel (AGCH) so as to allocate to the MS more than one time slot (TS) on an uplink of the communications channel and one or more time slots on the downlink of the communications channel, wherein the MS by indicating support for the RTTI indicates that a 10 ms round trip time (RTT) is to be used immediately instead of using 20 ms RTT in beginning and then upgrading to 10 ms RTT.

9. The method of claim 8, wherein the indicating step further comprises indicating, by the MS, the support thereof for the at least one RTTI and the New Immediate Assignment message by inserting an indication in a packet channel request from the MS where the indication indicates that the MS supports a reduced time transmission interval (RTTI).

10. The method of claim 8, wherein the indicating step further comprises indicating, by the MS, the support thereof for the at least one RTTI and the New Immediate Assignment message by inserting information in an access burst sent by the MS at initial system access on a Random Access Channel (RACH).

11. A system of reducing latency in communications channel, comprising;
a Radio Access Network (RAN) configured to receive an indication in a packet channel request from the MS where the indication indicates that the MS supports a reduced time transmission interval (RTTI);
the RAN configured in response to receiving the indication to use a field in an Immediate Assignment message sent on AGCH so as to allocate to a mobile station (MS) more than one time slot (TS) on an uplink of the communications channel and one or more time slots on a downlink of the communications channel, wherein the MS by indicating support for the RTTI indicates that a 10 ms round trip time (RTT) is to be used immediately instead of using 20 ms RTT in beginning and then upgrading to 10 ms RTT.

12. The system of claim 11, wherein the communications channel includes a Wideband Code Division Multiplex Access (WCDMA) system and an Enhanced Data GSM Environment (EDGE) system.

13. The system of claim 12, wherein the RAN is configured to assign the reduced time transmission interval (RTTI) and more than one timeslot for GPRS/EDGE temporary block flows (TBFs) TBFs during an Access Grant Channel (AGCH) assignment.

14. The system of claim 13, wherein the MS is configured to indicate to the RAN that it has the ability to accept the Immediate Assignment message.

15. The system of claim 14, wherein the MS is configured to include information in an access burst sent by the MS at initial system access on a Random Access Channel (RACH) indicating the ability of the MS to accept the Immediate Assignment message.

16. The system of claim 15, wherein the RAN is configured to modify access burst System Information (SI) to indicate the ability to the MS to accept the Immediate Assignment message.

17. The system of claim 11, wherein the Immediate Assignment message is a Multislot Immediate Assignment message.

18. A node in a wireless communications system adapted to reduce latency in a communications channel, comprising:
at least one computer processor that executes a computer program product or distributed software loaded into at least one memory location to implement following:
receiving from a mobile station (MS) an indication for support of at least one of a reduced time transmission interval (RTTI) and a New Immediate Assignment message;
matching MS support capabilities with current and expected round trip time requirements;
assigning a multislot configuration and RTTI configuration;
using, in response to the receiving operation, an additional field in an Immediate Assignment message sent on an Access Grant Channel (AGCH) so as to allocate to the MS more than one time slot (TS) on an uplink of the communications channel and one or more time slots on the downlink of the communications channel, wherein the MS by indicating support for the
RTTI indicates that a 10 ms round trip time (RTT) is to be used immediately instead of using 20 ms RTT in beginning and then upgrading to 10 ms RTT.

19. The node of claim 18, wherein the node is a base station subsystem (BSS).

20. The node of claim 18, wherein the at least one computer processor executes the computer program product or distributed software loaded into the least one memory location to implement following:
introducing a field in the Immediate Assignment message sent on the AGCH so as to allocate to the mobile station (MS) more than one time slot (TS) on an uplink of the communications channel and one or more time slots on a downlink of the communications channel.

21. The node of claim 20, wherein the communications channel includes a Wideband Code Division Multiplex Access (WCDMA) system and an Enhanced Data GSM Environment (EDGE) system.

22. The node of claim 21, wherein the at least one computer processor executes the computer program product or distributed software loaded into the least one memory location to implement following:

assigning the reduced time transmission interval (RTTI) and more than one timeslot for GPRS/EDGE temporary block flows (TBFs) TBFs during an Access Grant Channel (AGCH) assignment.

23. The node of claim 22, wherein the at least one computer processor executes the computer program product or distributed software loaded into the least one memory location to implement following:

receiving an indication from the mobile station (MS) indicating that the MS has the ability to accept an Immediate Assignment message.

24. The node of claim 23, wherein the at least one computer processor executes the computer program product or distributed software loaded into the least one memory location to implement following:

receiving the indication in an access burst sent by the MS at initial system access on a Random Access Channel (RACH) indicating the ability of the MS to accept the Immediate Assignment message.

25. The node of claim 24, wherein the at least one computer processor executes the computer program product or distributed software loaded into the least one memory location to implement following:

modifying access burst System Information (SI) sent by the node to indicate to the MS the ability of the RAN to support the Immediate Assignment message.

26. The node of claim 20, wherein the Immediate Assignment message is a Multislot Immediate Assignment message.

27. The node of claim 18, wherein the receiving operation further comprises receiving an indication in a packet channel request from the MS indicating the support thereof for the at least one RTTI and the New Immediate Assignment message.

28. The node of claim 18, wherein the receiving operation further comprises receiving information in an access burst sent by the MS at initial system access on a Random Access Channel (RACH), where the information indicates support by the MS for the at least one RTTI and the New Immediate Assignment message.

29. A method of reducing latency in a communications channel, the method implemented by a Mobile Station (MS) comprising the steps of:

receiving, from the Radio Access Network (RAN), a modified access burst System Information (SI) to indicate to the MS the ability of the RAN to support a new Immediate Assignment message to allocate to the MS more than one time slot (TS) on an uplink of the communications channel and one or more time slots on the downlink of the communications channel;

sending an access burst to the RAN at initial system access on the Random Access Channel (RACH) indicating the ability of the MS to accept the new Immediate Assignment message; and receiving, from the RAN in response to the sending step, the new Immediate Assignment message sent on an Access Grant Channel (AGCH), where the new Immediate Assignment message is used to allocate to the MS more than one time slot (TS) on an uplink of the communications channel and one or more time slots on the downlink of the communications channel, wherein the MS by indicating support for the new Immediate Access message indicates that a 10 ms round trip time (RTT) is to be used immediately instead of using 20 ms RTT in beginning and then upgrading to 10 ms RTT.

30. A method of reducing latency in a communications channel, the method implemented by a Radio Access Network (RAN) comprising the steps of:

sending, to a Mobile Station (MS), a modified access burst System Information (SI) to indicate to the MS the ability of the RAN to support a new Immediate Assignment message to allocate to the MS more than one time slot (TS) on an uplink of the communications channel and one or more time slots on the downlink of the communications channel;

receiving an access burst from the MS at initial system access on the Random Access Channel (RACH) indicating the ability of the MS to accept the new Immediate Assignment message;

sending, to the MS in response to the receiving step, the new Immediate Assignment message sent on an Access Grant Channel (AGCH), where the new Immediate Assignment message is used to allocate to the MS more than one time slot (TS) on an uplink of the communications channel and one or more time slots on the downlink of the communications channel, wherein the MS by indicating support for the new Immediate Access message indicates that a 10 ms round trip time (RTT) is to be used immediately instead of using 20 ms RTT in beginning and then upgrading to 10 ms RTT.

\* \* \* \* \*